Aug. 25, 1931.  J. L. FORD  1,820,656
SERVICE LINE METER MOUNTING
Filed April 10, 1929
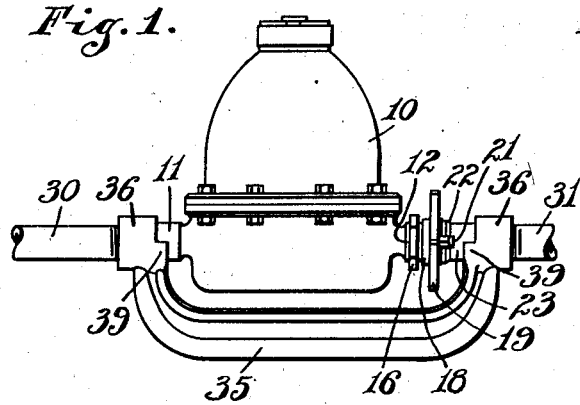
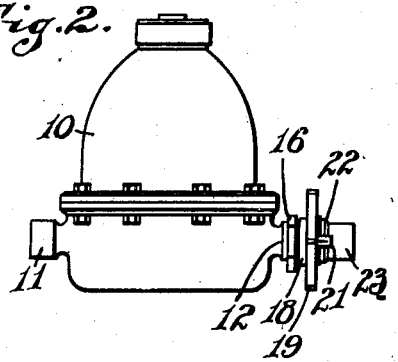
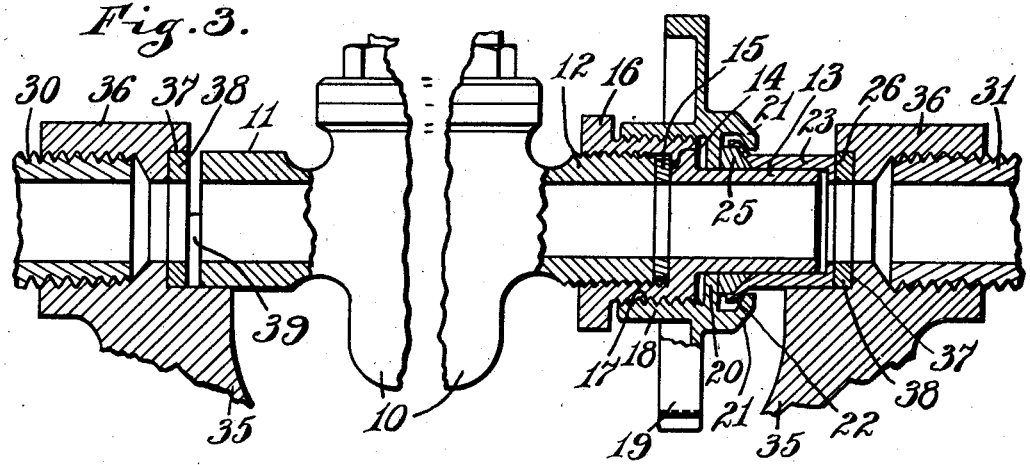
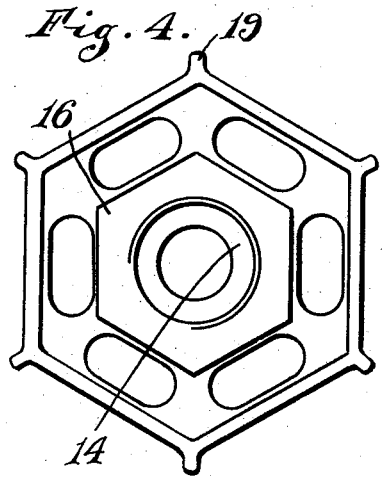
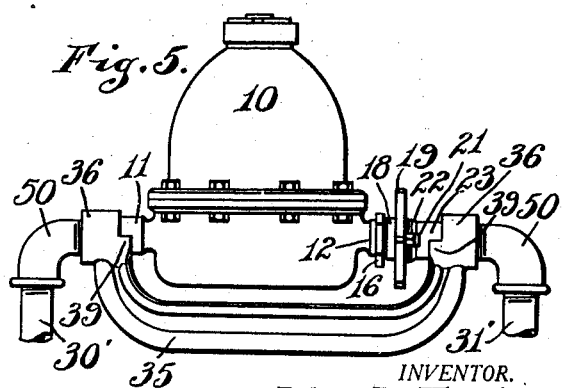
INVENTOR.
John L. Ford,
BY
Hood & Hahn
ATTORNEYS Patented Aug. 25, 1931

1,820,656

UNITED STATES PATENT OFFICE

JOHN L. FORD, OF WABASH, INDIANA, ASSIGNOR TO FORD METER BOX COMPANY, OF WABASH, INDIANA, A CORPORATION OF INDIANA

SERVICE LINE METER MOUNTING

Application filed April 10, 1929. Serial No. 354,020.

The object of my invention is to produce an improved means by which a water meter, or similar meter in structure, may be readily associated with and separated from a supply line.

The accompanying drawings illustrate my invention.

Fig. 1 is a side elevation of my improved structure associated with a meter;

Fig. 2 a side elevation of the meter attachment portion of my improvement in place on a meter;

Fig. 3 an axial section on the medial plane of Fig. 1;

Fig. 4 an elevation of the main nut;

Fig. 5 an elevation similar to Fig. 1, but showing the manner of forming the connection between two upright portions of a service line, instead of two horizontal portions of a service line as shown in Fig. 1.

In the drawings 10 indicates a meter of any standard construction provided with two oppositely-directed and preferably aligned, nipples 11 and 12, as usual, the nipple 12 being externally threaded. A sleeve 13 is internally threaded to receive the threads of nipple 12 and is shouldered at 14 with a plain shoulder between which, and the end of nipple 12 may be placed a packing gasket 15. The main portion of sleeve 13 is aligned with nipple 12 and at its internally threaded end said sleeve is provided with a polygonal flange 16 by means of which it may be tightly set upon nipple 12 with a wrench.

Sleeve 13 is provided with external threads 17 upon which is threaded a nut 18 provided with a hand wheel 19 by which it may be readily manipulated. Nut 14 is provided with an internally projecting annular flange 20 which closely surrounds the main portion of sleeve 13 and projecting from the outer face of this flange 20 are two diametrically opposed fingers 21, 21 which overhang the inclined base flange 22 of a pressure sleeve 23 which is sleeved upon sleeve 13. A packing gasket 25 is inserted between the inner face of flange 22 and the outer face of flange 20. The outer end of sleeve 23 is provided with an inturned annular flange so as to form a comparatively wide annular end face 26. To assemble the parts gasket 25 is inserted into base flange 22 and sleeve 23 is then projected laterally between and beneath fingers 21 until the bore of sleeve 23 is aligned with the bore through flange 20. Parts 18 and 23 are then sleeved over sleeve 13 and the threads of nut 18 engage with threads 17.

In many parts of the country, especially in warmer climates, the service pipes 30 and 31 are arranged horizontally only a short distance below the surface of the ground and projected into an open pit. In order to accurately space the adjacent ends of these two pipes I provide a rigid yoke 35, conveniently of cast iron, provided at each end with an internally threaded bored boss 36 adapted to receive standard service pipes. The inner face of each of these bosses is recessed at 37 to receive a packing gasket 38 of rubber or other suitable material and adjacent this recess the yoke is formed with a semi-cylindrical seat 39, one adapted to receive nipple 11 of the meter and the other adapted to receive sleeve 23 of the meter attachment, in such manner as to support the flow passage of the meter in alignment with the service pipes 30 and 31.

In practice the threaded connection between nut 18 and sleeve 13 is an easy running fit and sleeve 13, by the application of force to the polygonal flange 16, is set up hard against the end of nipple 12 so that the application of any reverse turning force to sleeve 13 through the medium of nut 18 will not be sufficient to loosen the sleeve. I am therefore able to use a highly compressible and therefore long lived gasket 15 because the nut 18 is not depended upon to set the sleeve 13 in position upon the meter.

The parts are so proportioned that when sleeve 23 is drawn practically to its full extent upon sleeve 13 the overall length between the end of nipple 11 and pressure face 26 will be slightly less than the distance between the exposed faces of the two gaskets 38. The meter may then be readily slipped into place as indicated in Fig. 3, whereupon a reverse turning of nut 18 will project the end of nipple 11 and the pressure face 26 against the adjacent gaskets 38, at the same time compressing gasket 25 and thus producing a tight connection between the two service pipes through the meter.

The yoke 35 being a unitary structure, may be readily assembled with the pipe 30, 31 and provides an accurate seat for the meter. If a connection is desired between upright service pipes 30', 31' ordinary street L's 50 (Fig. 5) may be connected with the bosses 36.

I claim as my invention:

In a meter connection comprising a sleeve adapted to abut a line element and a nut cooperable therewith to provide for longitudinal movement of said sleeve, a member threadedly engaged with said nut and telescopically engaged in said sleeve, said nut being cooperable with said member to force said sleeve into abutment with said line element, said member being internally threaded for engagement with a meter nipple, and means disposed at the meter-engaging end of said member and engageable by a wrench for setting said member up tightly on said meter nipple and for holding said member against rotation with said nut.

In witness whereof, I JOHN L. FORD, have hereunto set my hand at Wabash, Indiana, this 4th day of April, A. D. one thousand nine hundred and twenty-nine.

JOHN L. FORD.